United States Patent [19]

Nishikawa

[11] Patent Number: 5,305,445
[45] Date of Patent: Apr. 19, 1994

[54] SYSTEM AND METHOD EMPLOYING EXTENDED MEMORY CAPACITY DETECTION

[75] Inventor: Hirofumi Nishikawa, Tokyo, Japan

[73] Assignee: Kabushiki Kaisha Toshiba, Kawasaki, Japan

[21] Appl. No.: 985,225

[22] Filed: Dec. 1, 1992

Related U.S. Application Data

[63] Continuation of Ser. No. 424,712, Oct. 20, 1989, abandoned.

[30] Foreign Application Priority Data

Oct. 31, 1988 [JP] Japan .................................. 63-275566

[51] Int. Cl.$^5$ .............................................. G06F 12/02
[52] U.S. Cl. ..................................... 395/400; 395/425; 364/DIG. 1
[58] Field of Search ............................... 395/400, 425; 364/200 MS File, 900 MS File

[56] References Cited

U.S. PATENT DOCUMENTS

| | | | |
|---|---|---|---|
| 4,403,283 | 9/1963 | Myntti et al. | 395/425 |
| 4,468,729 | 8/1984 | Schwartz | 395/425 |
| 4,500,962 | 2/1985 | Lemaire et al. | 395/425 |
| 4,571,676 | 2/1986 | Mantellina et al. | 395/425 |
| 4,718,044 | 1/1988 | Matsuyama | 365/230.05 |
| 4,908,789 | 3/1990 | Blokkum et al. | 395/425 |
| 4,926,322 | 5/1990 | Stimac et al. | 395/425 |
| 4,943,910 | 7/1990 | Nakamura | 395/425 |
| 5,101,339 | 3/1992 | Fairman et al. | 395/400 |
| 5,109,521 | 4/1992 | Culley | 395/800 |
| 5,161,218 | 11/1992 | Catlin | 395/425 |

OTHER PUBLICATIONS

Ramdisk External Assembler, Dec. 5, 1986 (Compuserv).
IBM Technical Reference No. 1502494, Personal Computer Hardware Reference Library, pp. 1–8, pulished Mar. 1984.
Toshiba T3200SX Portable Personal Computer Reference Manual, Jul., 1989.

*Primary Examiner*—Glenn Gossage
*Attorney, Agent, or Firm*—Finnegan, Henderson, Farabow, Garrett & Dunner

[57] ABSTRACT

A memory system of a computer, such as a lap-top type personal computer, uses a standard memory having a reserve region of, for example, 384 KB or 512 KB, and an extended memory of, for example, 1 MB or 2 MB, mounted in a memory extend slot. The memory extend slot can produce a memory type signal representative of the type of extended memory. A capacity detector detects the capacity of the extended memory mounted in the memory extend slot based on the memory type signal output from the memory extend slot. A memory controller then assigns a reserve region to an address region following the address region of the extended memory, based on the capacity detection signal output from the capacity detector.

15 Claims, 7 Drawing Sheets

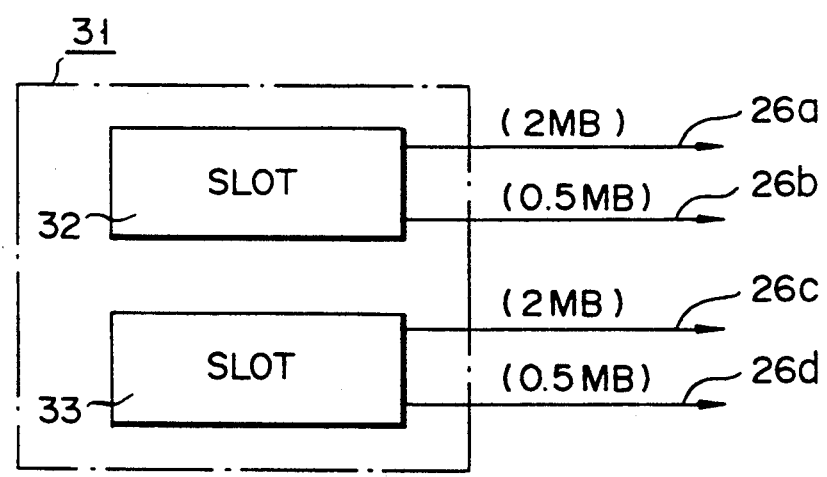
F I G. 3

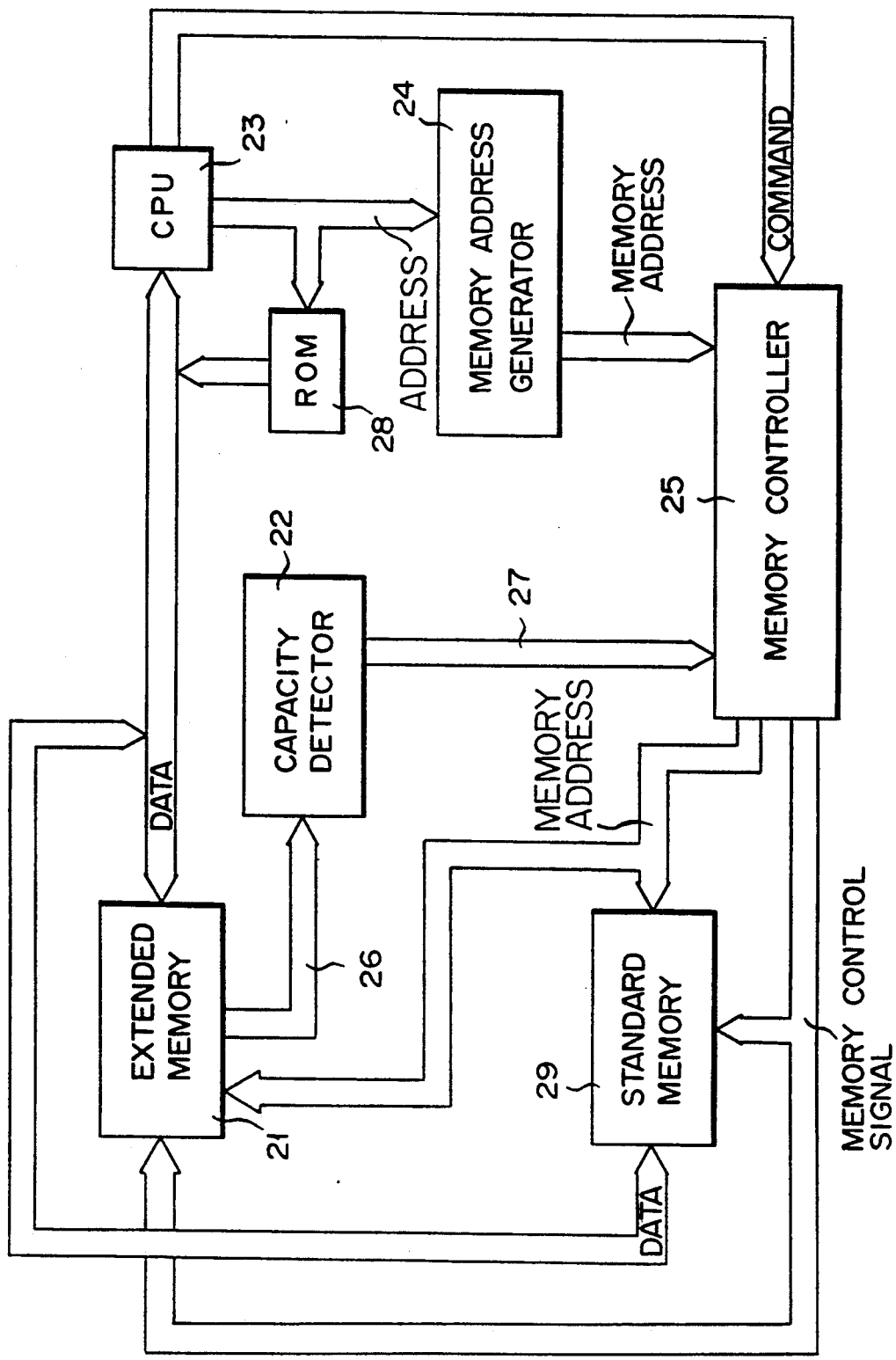
F I G. 2

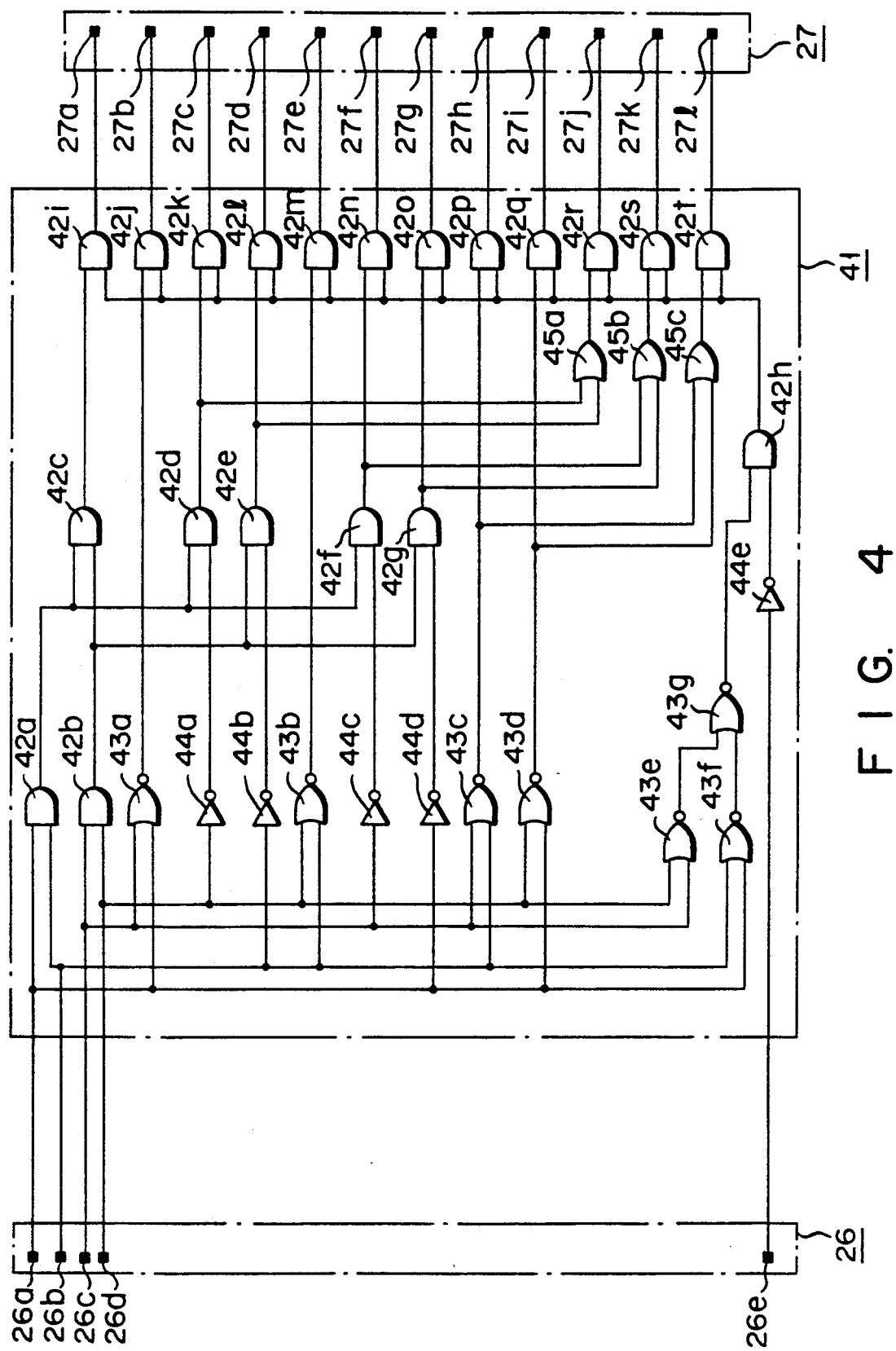
F I G. 4

SYSTEM AND METHOD EMPLOYING EXTENDED MEMORY CAPACITY DETECTION

This application is a continuation of U.S. patent application Ser. No. 07/424,712, filed Oct. 20, 1989, now abandoned.

BACKGROUND OF THE INVENTION

1. Field of the Invention

The present invention relates to a memory system having a memory extend function, which is used, for example, in a computer system such as a lap-top type personal computer.

2. Description of the Related Art

A conventional computer system of this type uses a standard memory having a memory capacity of, for example, 512 KB (Kilobytes) or 640 KB. Normally, the memory capacity required in an operating system (OS) is 512 KB or 640 KB.

A memory having a memory capacity of 1 MB (megabytes) has recently been used as a standard memory. In the case of the standard memory of 1 MB, 512 KB or 640 KB is used for the OS, and the remaining 512 KB or 384 KB is reserved for a BIOS (basic input/output system) RAM (random access memory), etc. The memory region used for the OS is referred to as "conventional memory", and the memory region used for the BIOS RAM, etc. is referred to as "reserve region".

There is known a method of effectively using the reserve region in a standard memory. According to this method, a memory region is extended by using an extended memory which can be freely mounted in a memory system. In this case, the address region of the reserve region is assigned to an address region of the extended memory. In other words, the reserve region is used as "EXTENDED memory" to extend the memory capacity of the extended memory.

The "EXTENDED memory" means a memory region which can be directly accessed by a CPU (central processing unit) in a protect mode. In addition to the "EXTENDED memory", an "EXPANDED memory" region is provided. The "EXPANDED memory" is indirectly accessed through a window area. In this description, only the "EXTENDED memory" will be described.

In FIG. 1, a 1 MB-extended memory 12 is coupled to a 1 MB-standard memory 11 having a 384 KB-reserve region. In this example, the reserve region of the standard memory 11 is assigned to memory addresses corresponding to 2 MB to 2 MB+384 KB.

In a conventional computer system, the capacity of the extended memory is fixed. Thus, memory addresses assigned to the reserve region of the standard memory are also fixed. However, in a computer system such as a lap-top type personal computer, extended memories of various capacities such as 1 MB, 2 MB, 3 MB, etc. have recently been used. In a computer system which can use such various extended memories, when the extended memories are used as "EXTENDED memory", the memory address assigned to the 384 KB reserve region in the standard memory needs to be changed from 2 MB to 2 MB+384 KB, 3 MB to 3 MB+384 KB, and 4 MB to 4 MB+384 KB, in accordance with the capacity of the extended memory.

SUMMARY OF THE INVENTION

The object of the present invention is to provide a memory system which can effectively use a reserve region provided in a standard memory, even if one of several extended memories having various capacities is selectively employed.

The preferred embodiments of the present invention provide a memory system comprising a standard memory having a reserve region, a memory extend slot for mounting an extended memory, capacity detection means for detecting the capacity of an extended memory mounted in the memory extend slot, and memory control means for assigning addresses of the reserve region to addresses following the addresses of the extended memory, in accordance with the capacity detected by the capacity detection means.

According to the memory system of the preferred embodiment of the present invention, the addresses of the reserve region of the standard memory can be assigned to the addresses following the addresses set in the extended memory in accordance with the capacity of the extended memory mounted in the memory extend slot. Thus, in the case where one of several extended memories having different capacities is selected and used, the reserve region set in the standard memory can be effectively used as "EXTENDED memory".

BRIEF DESCRIPTION OF THE DRAWINGS

FIG. 2 is a block diagram showing a structure of a memory system according to an embodiment of the present invention;

FIG. 3 shows a structure of memory extend sot in which extended memory of the memory system shown in FIG. 2 are mounted;

FIG. 4 shows a structure of a capacity detection circuit provided in the memory system shown in FIG. 2;

DETAILED DESCRIPTION OF THE PREFERRED EMBODIMENT

Figure 1:
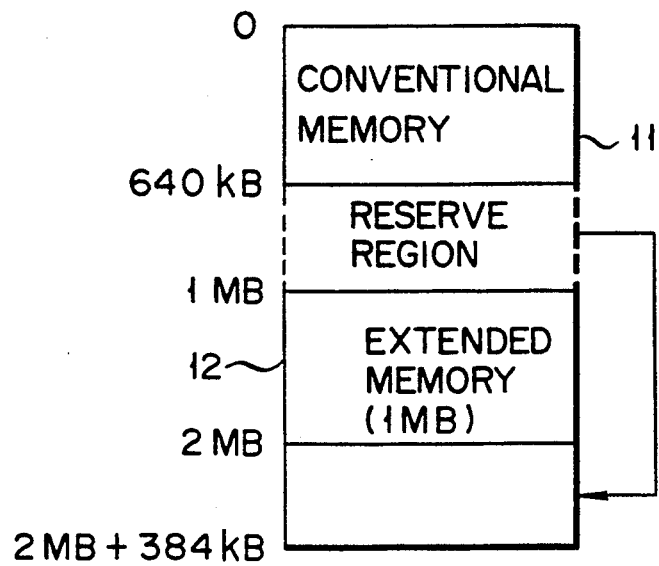
FIG. 1 shows a structure of a conventional memory system.

FIG. 2 is a block diagram showing the structure of a memory system according to one embodiment of the present invention. The memory system comprises an extended memory 21, a capacity detector 22, a CPU 23, a memory address generator 24, a memory controller 25, a memory type signal 26, a capacity detection signal 27, a ROM (read only memory) 28, and a standard memory 29.

The extended memory 21 is mountable in a memory extend slot 31 shown in FIG. 3. The memory extend slot 31 is provided in a system body (not shown). The extended memory 21 may be selected from several types of extended memories having capacities of 1 MB, 2 MB, 3 MB, etc.

The capacity detector 22 detects the capacity of the extended memory 21 based on the memory type signal 26 representative of the type of the extended memory 21. The capacity detector 22 outputs the capacity detection signal 27 representative of the detected capacity of the extended memory 21 to the memory controller 25. The CPU 23 controls the entire system through a system bus consisting of a data bus, an address bus, and a command bus. The memory address generator 24 receives an address from the CPU 23 and generates a memory address for memory access. The memory controller 25 supplies a memory control signal, consisting of a RAS (row address strobe), a CAS (column address strobe), etc., to the standard memory 29.

The memory type signal 26 is representative of the type of the extended memory 21, and consists of a plurality of signals 26a to 26e as shown in FIGS. 3 and 4. The signals 26a to 26e are described below. The capacity detection signal 27 is representative of the capacity of the extended memory 21, and consists of a plurality of signals 27a to 27l, as shown in FIG. 4. The signals 27a to 27l are also described below. The ROM 28 stores data such as a program for controlling the present system.

The standard memory 29, which is a 1 MB-memory having a reserve region, is initially mounted in the memory system. In the standard memory 29, a memory address region of 640 KB is used as a conventional memory under the control of an operating system (OS), and the remaining region of 384 KB is used as a reserve region. The reserve region is used, for example, as a region or extended memory in the form of RAM in which a BIOS stored in a ROM is copied.

FIG. 3 shows the structure of the memory extend slot 31 used in the embodiment shown in FIG. 2. The memory extend slot 31 has two slots 32 and 33. In the present embodiment, a pair of memory components having the same capacity are mounted in each of the slots 32 and 33, so as to set the capacity of the extended memory 21.

The slot 32 is connected to two signal lines for producing signals 26a and 26b representative of the type of memory mounted in the slot. For example, a pair of memories may have a total capacity of 2 MB (a 2 MB-memory pair), while another pair of memories may have a total capacity of 0.5 MB (a 0.5 MB-memory pair). When a 2 MB-memory is mounted in the slot 32, signal 26a is output. When a 0.5 MB-memory pair is mounted in the slot 32, signal 26b is output. Slot 33 is also connected to two signal lines for producing signals 26c and 26d representative of the type of memory mounted in the slot. When a 2 MB-memory pair is mounted in the slot 33, the signal 26c is output. When a 0.5 MB-memory pair is mounted in the slot 33, the signal 26d is output.

FIG. 4 shows the structure of the capacity detector 22 used in the embodiment shown in FIG. 2. The capacity detector 22 includes a logic circuit 41. The logic circuit 41 comprises AND gates 42a to 42t, NOR gates 43a to 43g, inverters 44a to 44e, and OR gates 45a to 45c.

AND gate 42a receives signals 26a and 26b and supplies output signals to first input terminals of AND gates 42c, 42d and 42f. AND gate 42b receives signals 26c and 26d and supplies output signals to a second input terminal of AND gate 42c and first input terminals of AND gates 42e and 42g, respectively. AND gate 42c receives output signals from AND gates 42a and 42b, and supplies an output signal to a first input terminal of AND gate 42i. AND gate 42d receives output signals from AND gate 42a and inverter 44a, and supplies output signals to first input terminals of AND gate 42k and OR gate 45a. AND gate 42e receives output signals from AND gate 42b and inverter 44b, and supplies output signals to a first input terminal of AND gate 42l and a second input terminal of OR gate 45a. AND gate 42f receives output signals from AND gate 42a and inverter 44c, and supplies output signals to a first input terminal of AND gate 42n and a first input terminal of OR gate 45b. AND gate 42g receives output signals from AND gate 42b and inverter 44d, and supplies output signals to a first input terminal of AND gate 42o and a second input terminal of OR gate 45b. AND gate 42h receives output signals from NOR gate 43g and inverter 44e, and supplies output signals to the second input terminals of AND gates 42i to 42t.

AND gate 42i receives output signals from AND gates 42c and 42h, and outputs signal 27a. AND gate 42j receives output signals from NOR gate 43a and AND gate 42h, and outputs signal 27b. AND gate 42k receives output signals from AND gate 42d and 42h, and outputs signal 27c. AND gate 42l receives output signals from AND gates 42e and 42h, and outputs signal 27d. AND gate 42m receives output signals from NOR gate 43b and AND gate 42h, and outputs signal 27e. AND gate 42n receives output signals from AND gates 42f and 42h, and outputs signal 27f. AND gate 42o receives output signals from AND gates 42g and 42h, and outputs signal 27g. AND gate 42p receives output signals from NOR gate 43c and AND gate 42h, and outputs signal 27h. AND gate 42q receives output signals from NOR gate 43d and AND gate 42h, and outputs signal 27i. AND gate 42r receives output signals from OR gate 45a and AND gate 42h, and outputs signal 27j. AND gate 42s receives output signals from OR gate 45b and AND gate 42h, and outputs signal 27k. AND gate 42t receives output signals from OR gate 45c and AND gate 2h, and outputs signal 27l.

NOR gate 43a receives signals 26a and 26c and outputs a signal to the first input terminal of AND gate 2j. NOR gate 43b receives signals 26b and 26d and outputs a signal to the first input terminal of AND gate 42m. NOR gate 43c receives signals 26b and 26c and outputs a signal to the first input terminals of AND gate 42p and OR gate 45c. NOR gate 43d receives signals 26a and 26d and outputs a signal to the first input terminal of AND gate 42q and the second input terminal of OR gate 45c. NOR gate 43e receives signals 26c and 26d and outputs a signal to the first input terminal of NOR gate 43g. NOR gate 43f receives signals 26a and 26b and outputs a signal to the second input terminal of NOR gate 43g. NOR gate 43g receives output signals from NOR gates 43e and 43f, and outputs a signal to the first input terminal of AND gate 42h.

Inverter 44a receives signal 26d and outputs a signal to the second terminal of AND gate 42d. Inverter 44b receives signal 26b and outputs a signal to the second terminal of AND gate 42e. Inverter 44c receives signal 26c and outputs a signal to the second terminal of AND gate 42f. Inverter 44d receives signal 26a and outputs a signal to the second terminal of AND gate 42g. Inverter 44e receives signal 26e and outputs a signal to the second terminal of AND gate 42h.

OR gate 45a receives output signals from AND gates 42d and 42e, and outputs a signal to the first input terminal of AND gate 42r. OR gate 45b receives the output signals from AND gates 42f and 42g, and outputs a signal to the first input terminal of AND gate 42s. OR gate 45c receives the output signals from NOR gates 43c and 43d, and outputs a signal to the first input terminal of AND gate 42t.

The logic circuit 41 having the above-described structure receives signals 26a to 26e and outputs signals 27a to 27l representative of the capacity of the extended memory 21 in accordance with signals 26a to 26e. The signals 26a to 26d are supplied from the memory extend slot 31 and are active low. Signal 26e is a signal for a special register and is active high. For example, when a large-capacity extended memory 21 such as an 8 MB-memory is used, the signal 26e is generated by an operation performed by the user. Signals 27a to 27l, which are also active high, are output by the logic circuit 41 under the following conditions., (1) Signal 27a is output when memories are not mounted in slots 32 and 33;

(2) Signal 27b is output when 2 MB-memory pairs are mounted in both slots 32 and 33;

(3) Signal 27c is output when no memory is mounted in slot 32 and a 0.5 MB-memory pair is mounted in slot 33;

(4) Signal 27d is output when a 0.5 MB-memory pair is mounted in slot 32 and no memory is mounted in slot 33;

(5) Signal 27e is output when 0.5 MB-memory pairs are mounted in both slots 32 and 33;

(6) Signal 27f is output when no memory is mounted in slot 32 and a 2 MB-memory pair is mounted in slot 33;

(7) Signal 27g is output when a 2 MB-memory pair is mounted in slot 32 and no memory is mounted in slot 33;

(8) Signal 27h is output when a 0.5 MB-memory pair is mounted in slot 32 and a 2 MB-memory pair is mounted in slot 33;

(9) Signal 27i is output when a 2 MB-memory pair is mounted in slot 32 and a 0.5 MB-memory pair is mounted in slot 33;

(10) Signal 27j is output when a 0.5 MB-memory pair is mounted in slot 32 or slot 33, but not both;

(11) Signal 27k is output when a-2 MB-memory pair is mounted in slot 32 or slot 33, but not both; and

(12) signal 27l is output when a 0.5 MB-memory pair is mounted in slot 32 and a 2 MB-memory is mounted in slot 33, or when a 2 MB-memory is mounted in slot 32 and a 0.5 MB-memory is mounted in slot 33.

Signals 27a to 27l are all disabled (low) when the capacity of the extended memory 21 is erroneously set, as will be described later or an 8 MB-extended memory is used (i.e., when the signal 26e is output).

Figure 5:
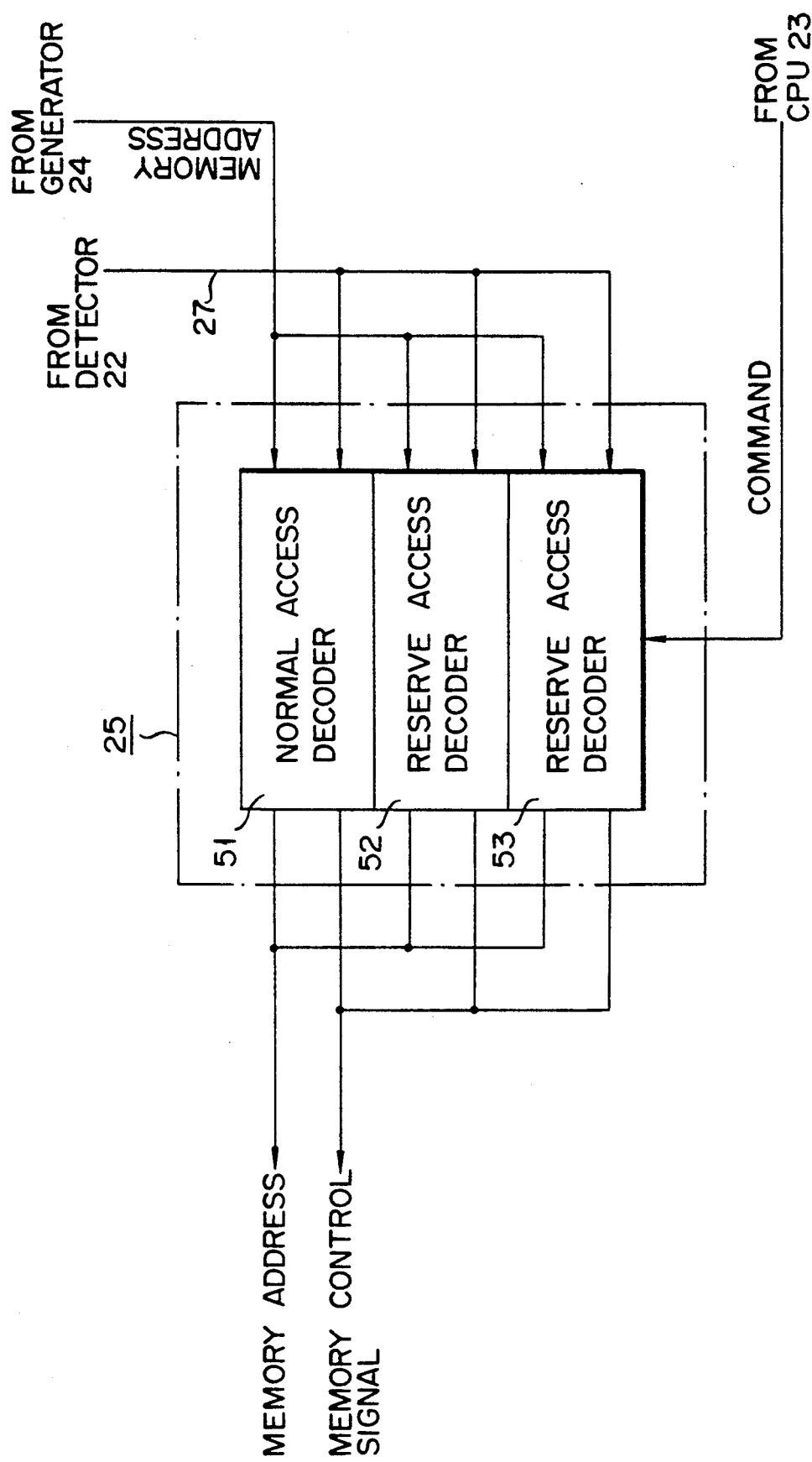
FIG. 5 shows a structure of a memory controller provided in the memory system shown in FIG. 2.

FIG. 5 shows a structure of the memory controller 25 used in the embodiment of FIG. 2. The memory controller 25 includes a normal access decoder 51, a first reserve access decoder 52, and a second reserve access decoder 53. The normal access decoder 51 is used for accessing the region of memory addresses corresponding to a 640 KB conventional memory in the 1 MB-standard memory 29. The normal access decoder 51 produces a memory address for accessing the conventional memory and a memory control signal. The first reserve access decoder 52 is used to access a 384 KB reserve region in the 1 MB-standard memory 29 and produces a memory address and a memory control signal for accessing the reserve region. The second reserve access decoder 53 is used to access a 512 KB reserve region in the 1 MB-standard memory 29, and produces a memory address and a memory control signal for accessing the 512 KB-reserve region. The decoders 51, 52, and 53 are switched by a command signal from the CPU 23.

The operation of the above embodiment will now be described.

The extended memory 21 is first mounted in the memory extend slot 31 provided in the system body. The memory extend slot 31 has two slots 32 and 33. In the present embodiment, a pair of memory components having the same capacity are mounted in each of slots 32 and 33 to set the capacity of the extended memory 21. By combining different types pairs of memories having total capacities of 0.5 MB or 2 MB, for example, in the two memory slots 32 and 33, nine different modes of extended memories are possible and six types (0 MB, 0.5 MB, 1 MB, 2 MB, 2.5 MB, 4 MB) of extended memory capacities are selectable.

For example, when a 1 MB-extended memory is needed as the extended memory 21, a pair of 0.5 MB memories is mounted in each of slots 32 and 33. That is, a 0.5 MB-memory pair is mounted in each of slots 32 and 33 to obtain an extended memory 21 having a capacity of 1 MB. At this time, signal 26b from slot 32 and signal 26d from slot 33 are output to the capacity detector 22, which detects that an extended memory 21 of 1 MB has been mounted.

Suppose that the user has erroneously mounted a 0.5 MB memory component and a 2 MB memory component in slot 32, or has erroneously mounted a 0.5 MB memory component and a 2 MB memory component in slot 33. If this happens, both signals 26a and 26b (indicating a 0.5 MB memory) are output (active low) from slot 32. Similarly, both signals 26c and 26d are activated and output from slot 33. Once the signals 26a and 26b (or 26c and 26d) are activated, output signals 27a to 27l of the logic circuit 41 shown in FIG. 4 are all disabled. The fact that all signals 27a to 27l are disabled indicates that the extended memory 21 is not mounted correctly.

As described above, if the capacity of the extended memory 21 is erroneously set, it is regarded that the extended memory 21 is not mounted. Thus, even if the capacity of the extended memory 21 is erroneously set, a malfunction of the system can be prevented. When the extended memory 21 having a specific capacity (e.g. 8 MB), which is not set by the above setting operation, is used, the user designates this fact in advance. In this case, all signals 27a to 27l are disabled by the signal 26e for a special register.

Figure 6:
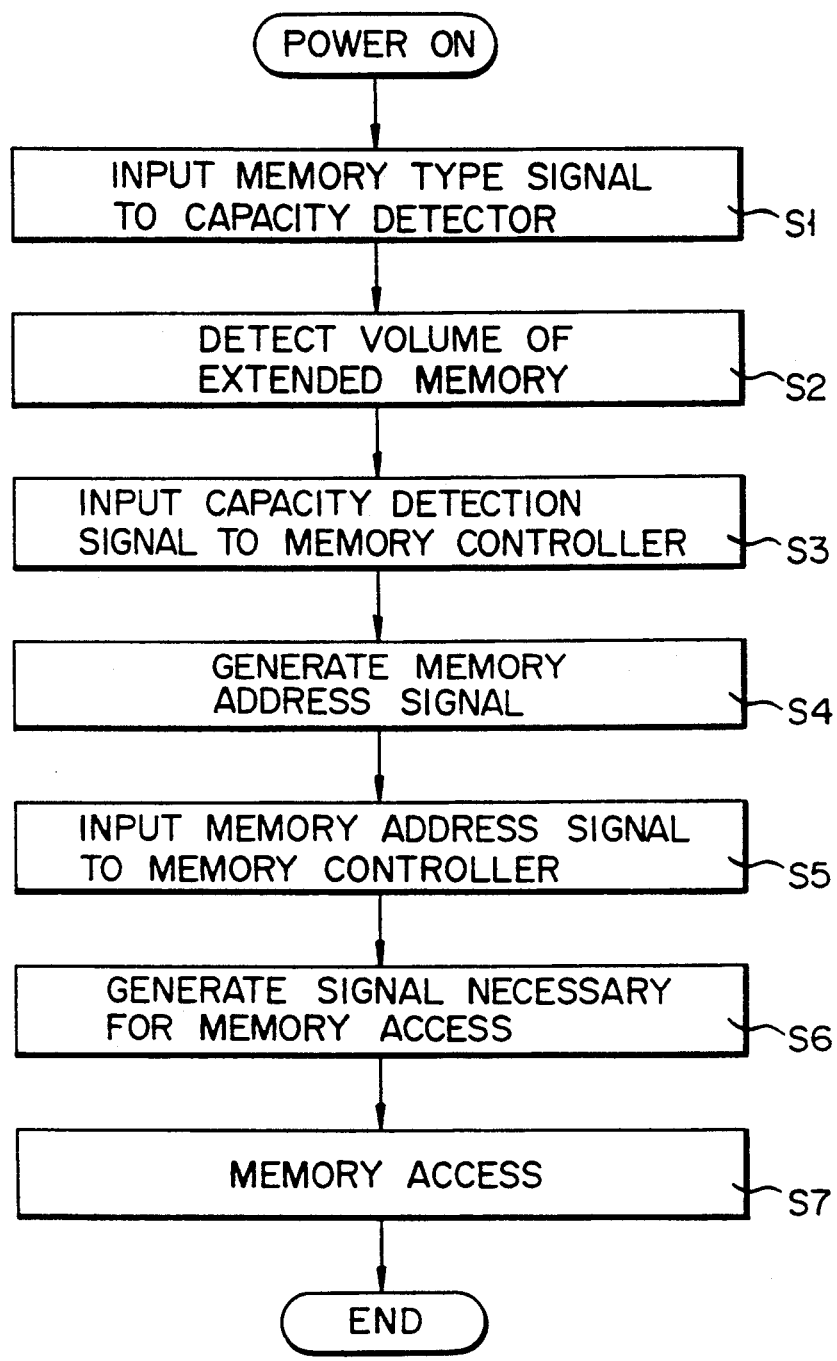
FIG. 6 is a flowchart for explaining the operation of the memory system shown in FIG. 2.

The operation of the system will now be described by referring to a flowchart of FIG. 6. In the operation described in FIG. 6, the extended memory 21 is correctly mounted and the power is turned on to access the reserve region of the standard memory 29 serving as "EXTENDED memory".

When the extended memory 21 is mounted, the memory type signal 26 representative of the type of the extended memory 21 is input to the capacity detector 22 (Step S1). The memory type signal 26 consists of signals 26a to 26e as shown in FIG. 4. For example, when a 2 MB-memory composed of a pair of memories is mounted in slot 32, signal 26a among signals 26a to 26e is activated. Based on the memory type signal 26, the capacity detector 22 detects the capacity of the extended memory 21 (Step S2). The capacity detection signal 27 indicative of the detected capacity is output from the capacity detector 22 to the memory controller 25 (Step S3). The capacity detection signal 27 consists of signals 27a to 27l as shown in FIG. 4. The signals 27a to 27l are output by the capacity detector 22 in accordance with the levels of the signals 26a to 26e.

To access the memory, the CPU 23 outputs an address signal to the memory address generator 24. Upon receiving the address signal, the memory address generator 24 generates the memory address signal to access the standard memory 29 (Step S4). The memory address signal is output from the memory address generator 24 to the memory controller 25 (Step S5).

The capacity detection signal 27 and the memory address signal are both input to the memory controller 25. In accordance with the two input signals, the memory controller 25 generates the memory control signal (RAS signal, CAS signal) and the signal such as a memory address signal necessary for the memory access (Step S6). Thus, the standard memory 29 is accessed (Step S7).

As shown in FIG. 5, the memory controller 25 includes three decoders 51, 52 and 53. One of these decoders is selected by the command from the CPU 23. For example, when the 384 KB reserve region of the 1 MB-standard memory 29 is accessed, the first reserve access decoder 52 is selected. The first reserve access decoder 52 decodes the capacity detection signal 27 and the memory address signal, to produce a signal necessary for accessing the 384 KB-reserve region.

Figure 7B:
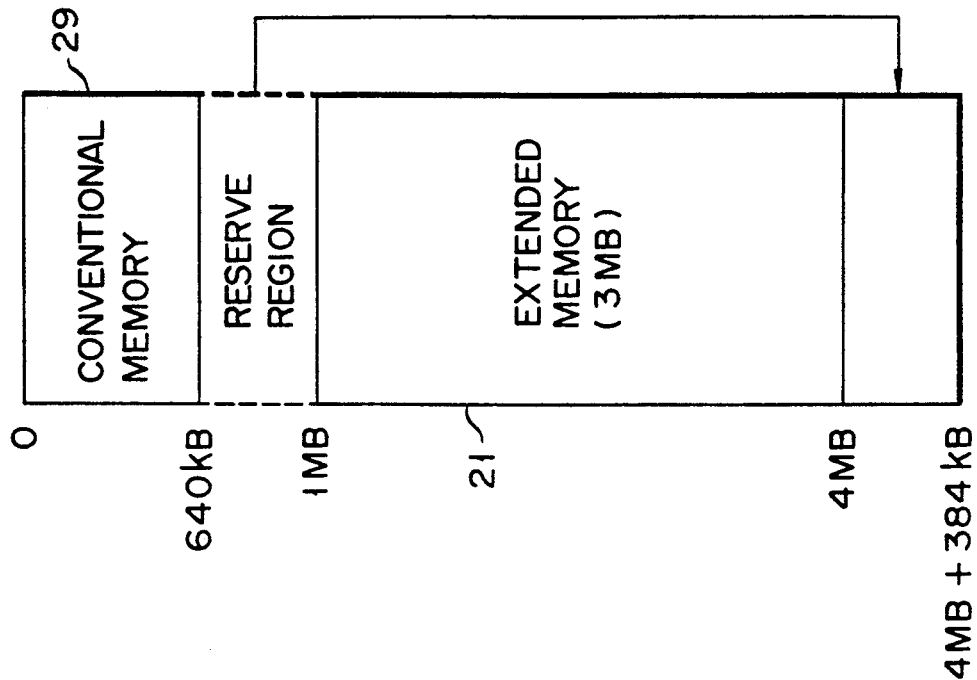
FIGS. 7A and 7B show structures of the memory system according to the embodiment of the invention shown in FIG. 2.
Figure 7A:
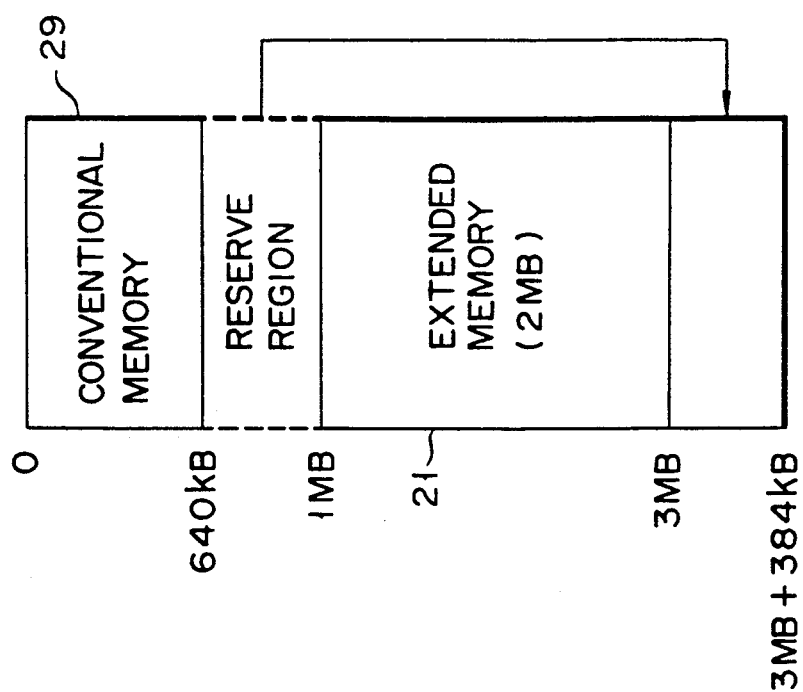

In other words, when the capacity detection signal 27 is representative of, for example, "2 MB" and the memory address signal is representative of, for example, addresses corresponding to "3 MB to 3 MB+384 KB", the reserve access decoder 52 produces a signal for accessing the 384 KB-reserve region. As a result, the 384 KB-reserve region set in the 1 MB-standard memory 29 is assigned to addresses 3 MB to 3 MB+384 KB which follow the addresses in the 2 MB extended memory 21 as shown in FIG. 7A. Similarly, when the capacity detection signal 27 is representative of, for example, "3 MB" and the memory address signal is representative of, for example, addresses corresponding to "4 MB to 4 MB+384 KB", the reserve access decoder 52 produces a signal for accessing the 384 KB-reserve region. As a result, the 384 KB-reserve region of the standard memory 29 is assigned to addresses 4 MB to 4 MB+384 KB which follow the addresses in the 3 MB extended memory 21 as shown in FIG. 7B.

In this manner, the 384 KB-reserve region is assigned to an address region following the address region of the extended memory 21, in accordance with the capacity of the extended memory 21. Thereafter, the reserve region is used as an "EXTENDED memory". Thus, where one of several extended memories having different capacities is selected as the extended memory 21, the reserve region set in the standard memory 29 can be effectively used.

In the above embodiment, a reserve region of 384 KB has been used in the standard memory 29. However, the capacity of the reserve region can be changed, depending on the system. For example, the capacity of the conventional memory of the standard memory 29 may be set to 512 KB, and the reserve region of the standard memory 29 may be set to 512 KB. In this case, the reserve region can also be effectively used in accordance with the capacity of the extended memory 21, as stated above.

Figure 8B:
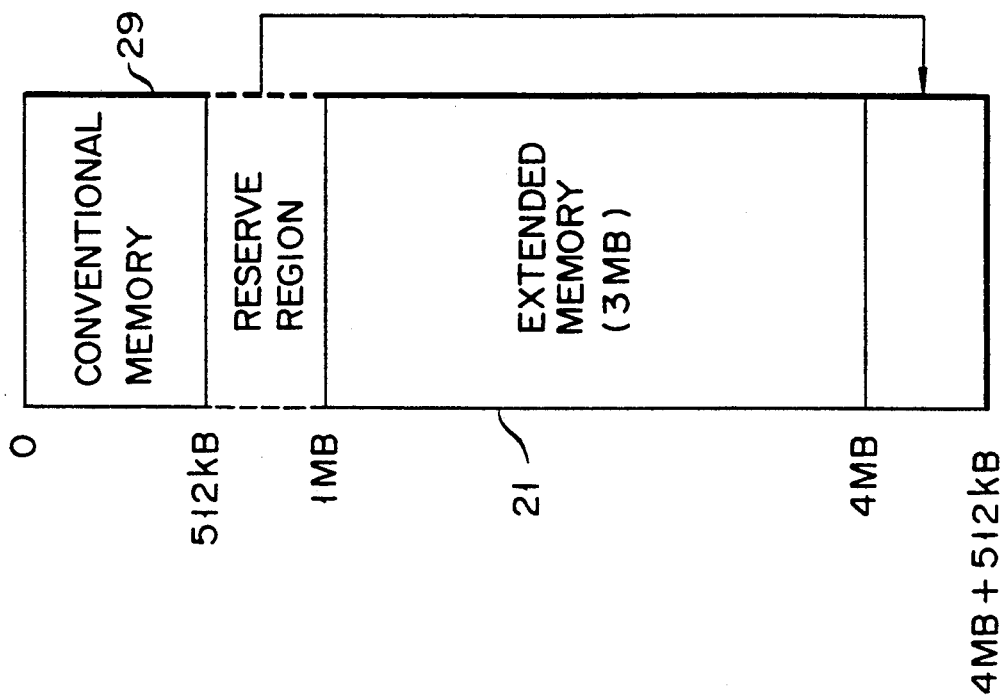
FIGS. 8A and 8B show structures of a memory system according to another embodiment of the present invention.
Figure 8A:
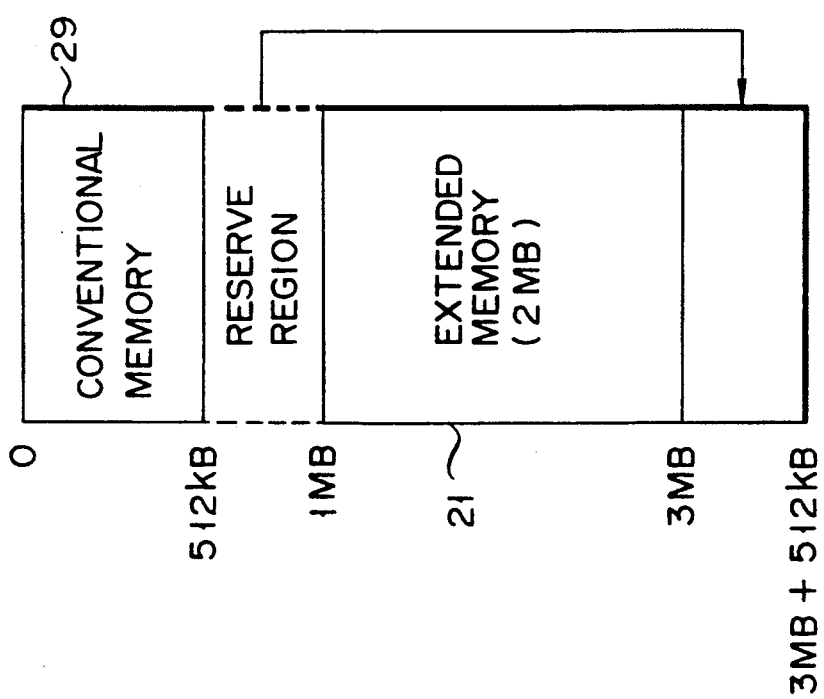

For example, as shown in FIGS. 8A and 8B, in accordance with the capacity of the extended memory 21, the reserve region of 512 KB set in the 1 MB-standard memory 29 may be assigned to an address region set in the extended memory 21 and can be used as "EXTENDED memory".

What is claimed is:

1. A memory system comprising:
    a standard memory having a reserve region;
    a memory slot means for receiving a memory;
    capacity detection means, responsive to a signal from said memory slot means, for detecting a capacity of said memory received by said memory slot means, and for generating a capacity detection signals; and
    memory control means, responsive to said capacity detection signal, for assigning said reserve region of said standard memory to an address region following an address region of said memory received by said memory slot means.

2. The system according to claim 1, wherein said reserve region has a capacity of 384 KB or 512 KB.

3. The system according to claim 1, wherein said memory slot means has at least two slots.

4. The system according to claim 3, wherein each slot receives a pair of memory components having the same capacity.

5. The system according to claim 3, wherein said capacity detection means includes means for disabling the generation of said capacity detection signal whenever one of said pair of memory components received by one of said slots has a different capacity than the other of said pair of memory components received by that slot.

6. A memory system comprising:
    a standard memory having a reserve region;
    a memory slot means for receiving a memory having a pair of components, said memory slot means including means for generating a memory type signal in accordance with a capacity of said memory;
    capacity detection means for detecting a capacity of said memory received by said memory slot means in response to said memory type signal, and for outputting a capacity detection signals in accordance with the detected capacity of said memory received by said memory slot means; and
    memory control means for determining a capacity of said memory received by said memory slot means in response to said capacity detection signal, and for generating a memory address and a memory control signal to access said standard memory and said memory received by said memory slot means, and for assigning said reserve region of said standard memory to an address region following an address region of said memory received by said memory slot means.

7. The system according to claim 6, wherein said reserve region has a capacity of 384 KB or 512 KB.

8. The system according to claim 6, wherein said memory slot means has at least two slots, each slot including means for generating a memory type signal to indicate a capacity of memory mounted therein.

9. The system according to claim 8, wherein each slot receives a pair of memory components having the same capacity.

10. The system according to claim 9, wherein said capacity detection means comprises:
    logic circuit means for generating said capacity detection signal in response to the memory type signals generated by said slots, and
    means for disabling the generation of said capacity detection signal whenever one of said pair of memory components received by one of said slots has a different capacity than the other of said pair of memory components received by that slot.

11. The system according to claim 10, wherein said memory control means comprises:
   decoding circuit means for receiving an address signal and for decoding said capacity detection signals to generate a memory address and a memory control signal for accessing said standard memory.

12. A method for accessing a standard memory having a reserve region in a memory system which can be extended by a memory mounted in a memory slot, the method comprising the steps, performed by a processor, of:
   detecting, responsive to a signal from said memory slot, a capacity of said memory mounted in said memory slot;
   generating a capacity detection signal in accordance with the detected capacity;
   determining a capacity of said memory mounted in said memory slot in response to said capacity detection signal, and
   assigning said reserve region of said standard memory to an address region following an address region of said memory mounted in said memory slot in accordance with the capacity of said memory mounted in said memory slot.

13. The method of claim 12, wherein said memory slot receives a pair of memory components having the same capacity, and the method further comprises a step of disabling the generation of the capacity detection signal whenever one of said pair of memory components received by one of said slots has a different capacity than the other of said pair of memory components received by that slot.

14. A method for accessing a standard memory having a reserve region in a memory system which can be extended by a memory mounted in a memory slot, the method comprising the steps, performed by a processor, of:
   generating a memory type signal in accordance with said memory mounted in said slot;
   detecting a capacity of said memory mounted in said memory slot in response to said memory type signal;
   generating a capacity detection signal in accordance with the detected capacity;
   determining a capacity of said memory mounted in said memory slot in response to said capacity detection signal;
   assigning said reserve region of said standard memory to an address region following an address region of said memory mounted in said memory slot in accordance with the capacity of said memory mounted in said memory slot;
   generating a memory address and a memory control signal; and
   accessing said standard memory in accordance with said memory address and memory control signal.

15. The method of claim 14, wherein said memory slot receives a pair of memory components having the same capacity, the method further comprising the steps of:
   disabling the generation of said capacity detection signal whenever one of said pair of memory components received by one of said slots has a different capacity than the other of said pair of memory components received by that slot.

* * * * *